April 30, 1940.  R. P. LANSING  2,199,319
ELECTRICITY GENERATION
Filed Jan. 24, 1939
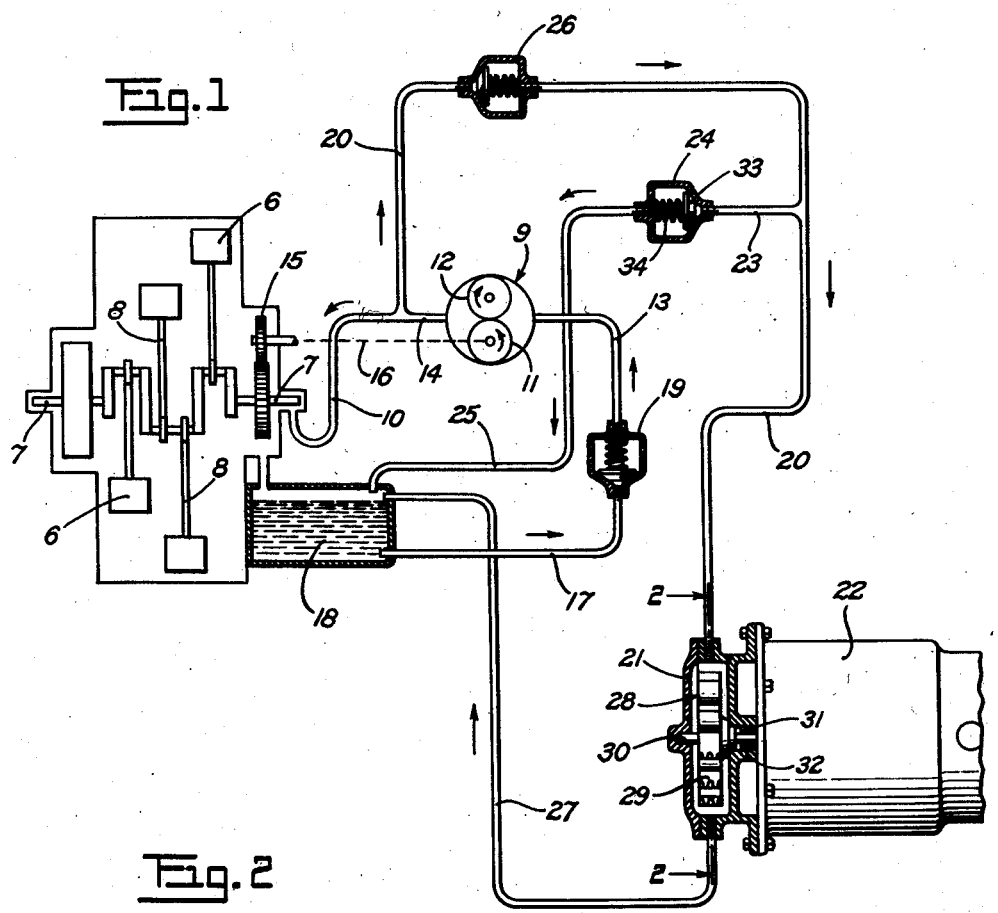
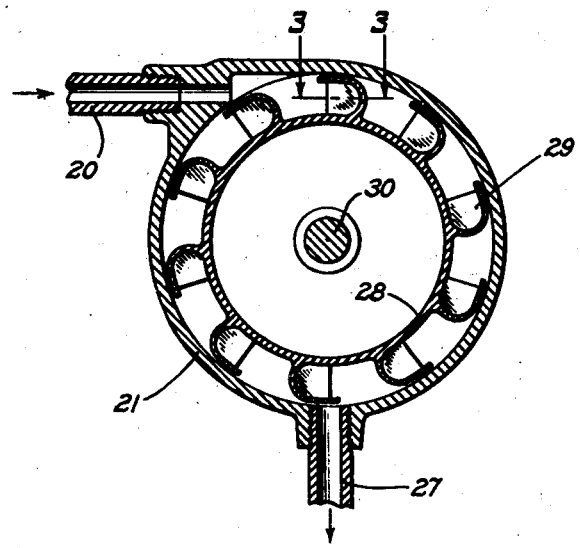
INVENTOR.
Raymond P. Lansing
BY Martin J. Finnegan
ATTORNEY.

Patented Apr. 30, 1940

2,199,319

UNITED STATES PATENT OFFICE 2,199,319

ELECTRICITY GENERATION

Raymond P. Lansing, Montclair, N. J., assignor to Bendix Aviation Corporation, South Bend, Ind., a corporation of Delaware Application January 24, 1939, Serial No. 252,679

4 Claims. (Cl. 290—52)

This invention relates to internal combustion engines and particularly to lubrication thereof.

An object of the invention is to produce generation of electric current by the diversion of lubricating oil from the engine's lubricating system.

As disclosed herein the current generation results from utilizing the pressure prevailing in the lubricating system, as by tapping into the pressure side of the system and directing the oil thus diverted (with its pressure regulated by suitable means) to a rotatable element having driving relation to a current generating machine.

Other objects and phases of the invention will appear as the description of the particular physical embodiment selected to illustrate the invention progresses, and as reference is made to the accompanying drawing constituting part of the disclosure. It is to be expressly understood, however, that the drawing is for the purpose of illustration only, and is not designed as a definition of the limits of the invention, reference being had to the appended claims for this purpose.

In the drawing:

Fig. 1 is a diagram showing the relationship of the generator driving means to the lubricating system of the engine;

Fig. 2 is an enlarged sectional view on the line 2—2 of Fig. 1; and

Fig. 3 is a detailed section on the line 3—3 of Fig. 2.

The engine is shown as of the type having a plurality of pistons 6 disposed on both sides of a crankshaft 7 to which they are drivably connected by the usual rods 8, and also having an oil pump 9 feeding lubricating oil to a conduit 10 at sufficient pressure to assume a suitable supply of lubricating oil to the engine crankshaft 7 and parts connected therewith. The pump 9, as represented, has a pair of inter-meshed gears 11, 12 adapted to rotate within a chamber to which the fluid has ingress by way of conduit 13 and egress by way of conduit 14. A shaft (indicated schematically at 16 in Fig. 1) connects gear 11 with a gear train 15 to provide motion transmitting means to the said gear 11 from the crankshaft 7, for transmission of driving torque from the engine to the pump.

The pump inlet 13 is connected to a closed reservoir 18 through the medium of a suitable conduit 17 having a check valve therein. This reservoir 18 contains a proper supply of oil, and the pipe 17 extends into this body of oil at a point near the bottom of the tank as shown in Fig. 1.

Tapped into conduit 10 (near outlet 14) is a pipe 20 leading to a closed casing 21 attached to an electric generator 22, and tapped from pipe 20 is a pipe 23 with a by-pass valve 24 which in turn is connected by a pipe 25 with the top of reservoir 18. A similar valve 26 is interposed in the first length of the pipe 20 to control the amount of oil diverted from conduit 10 to the pipe 20. The casing 21 is connected by a pipe 27 with the reservoir 18 at a point near the upper surface thereof. The by-pass valve 24 includes a casing within which operates a valve 33 normally closing the entrance to such casing from the pipe 23, and opening only when the pressure exceeds the strength of the coil spring 34, tending to hold such valve seated. When the pressure of the oil delivered from the pump 9 exceeds a predetermined amount, the oil is by-passed through the pipes 20 and 27; and when the pressure reaches a still higher value some of the oil is by-passed a second time, this time through the pipes 23 and 25, with the result that the pressure of the oil admitted to the casing 21 is predetermined and kept substantially constant.

Within the casing 21 there is mounted a rotatable wheel 28 having a series of peripheral vanes 29, the wheel being secured to a shaft 30 which is the extended armature shaft of the generator that passes through suitable stuffing boxes 31 in the end plate 32 of the generator and transversely of the casing 21, as shown in Fig. 1. This generator 22 otherwise is of the usual character and is connected in the ordinary manner by means of wires or cables to a battery (not shown) and/or other devices to be energized.

When the engine is operating a constant supply of lubricating oil is fed to the crankshaft and connecting passages by way of pump outlet 14 and conduit 10; but some of the supply is diverted, under the control of the valve 26, and flows along the pipe 20 to the casing 21. The pipe 20 enters this casing in such a manner as to cause the oil to impinge against the vanes or pockets of the wheel 28, the vanes being preferably of the cross section shown in Fig. 3. This wheel is thereby rotated and constitutes a turbine for rotating the generator at a substantially constant speed during the engine operation and regardless of the speed of such engine. The oil under pressure having thus performed its work is led from the casing 21 to the reservoir 18 by means of the pipe 27. The suction of the pump draws the oil from the tank 18 upwardly through the pipe 17, past the check valve 19, and into the inlet 13 of the pump. This completes a circuit of the oil under pressure.

My system thus permits of the operation of the generator at constant speed throughout practically the entire range of operating speeds of the engine, whereby, if a constant load is connected to the generator, no other means of regulation is necessary.

What is claimed is:

1. In combination with an internal combustion engine of the pressure lubricated type, and including as a part thereof an oil pump driven thereby and an engine lubricating duct leading from said pump to other rotatable parts of the engine, an electric generator having an oil receiving driving element in driving relation thereto, means for leading oil from said lubricating duct to said generator driving element, means for by-passing oil around said generator driving element, and means for maintaining unrestricted flow to said generator driving element notwithstanding simultaneous operation of said by-passing means.

2. In combination with an internal combustion engine of the pressure lubricated type, and including as a part thereof an oil pump driven thereby and an engine lubricating duct leading from said pump to other rotatable parts of the engine, an electric generator having an oil receiving driving element in driving relation thereto, means for leading oil from said lubricating duct to said oil receiving driving element, said means including a second duct having a valve therein biased to the closed position, and a third duct also having a valve biased to the closed position, said third duct being connected with said second duct at a point between said first-named valve and said generator.

3. In combination with an internal combustion engine including as a part thereof an oil pump driven thereby, an electric generator having an oil receiving driving element in driving relation thereto, means for leading oil to said generator driving element from said oil pump, means for by-passing oil around said generator driving element, and means for maintaining unrestricted flow to said generator driving element notwithstanding simultaneous operation of said by-passing means.

4. In combination with an internal combustion engine including as a part thereof a fluid pump driven thereby, an electric generator having a fluid receiving driving element in driving relation thereto, means for leading fluid to said generator driving element from said fluid pump, means for by-passing fluid around said generator driving element, and means for maintaining unrestricted flow to said generator driving element notwithstanding simultaneous operation of said by-passing means.

RAYMOND P. LANSING.